C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 1.

INVENTOR
C. E. Larrabee
BY
Kerr, Page, Cooper & Hayward
ATTORNEY

C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 2.

INVENTOR
C. E. Larrabee
BY
Kerr, Page, Cooper & Hayward
ATTORNEY

C. E. LARRABEE.
COASTER RECORDER.
APPLICATION FILED MAR. 27, 1919. RENEWED FEB. 9, 1920.

1,334,956.
Patented Mar. 30, 1920.
14 SHEETS—SHEET 3.

INVENTOR
C. E. Larrabee
BY
Kerr, Page, Cooper & Hayward
ATTORNEY

C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 4.

INVENTOR
C. E. Larrabee
BY
Kerr, Page, Cooper & Hayward.
ATTORNEY

C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 5.

INVENTOR
C. E. Larrabee
BY
Kerr, Page, Cooper & Hayward
ATTORNEY

C. E. LARRABEE.
COASTER RECORDER.
APPLICATION FILED MAR. 27, 1919. RENEWED FEB. 9, 1920.
1,334,956.
Patented Mar. 30, 1920.
14 SHEETS—SHEET 6.
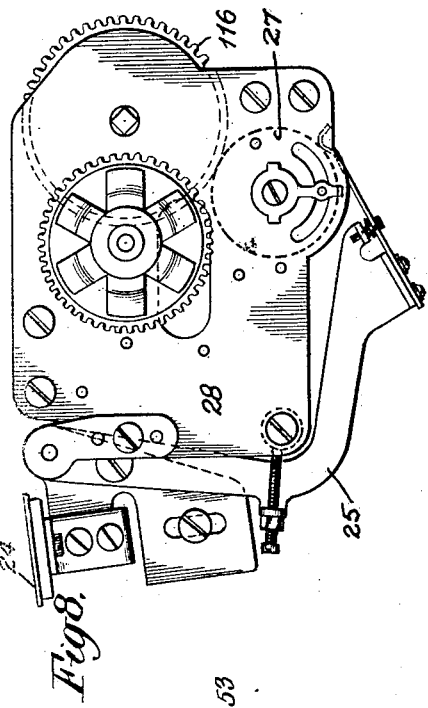
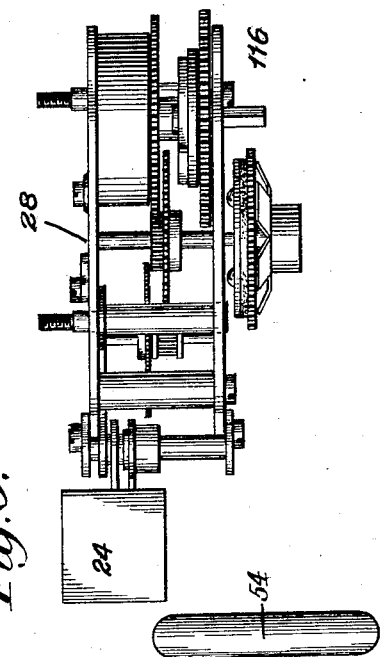
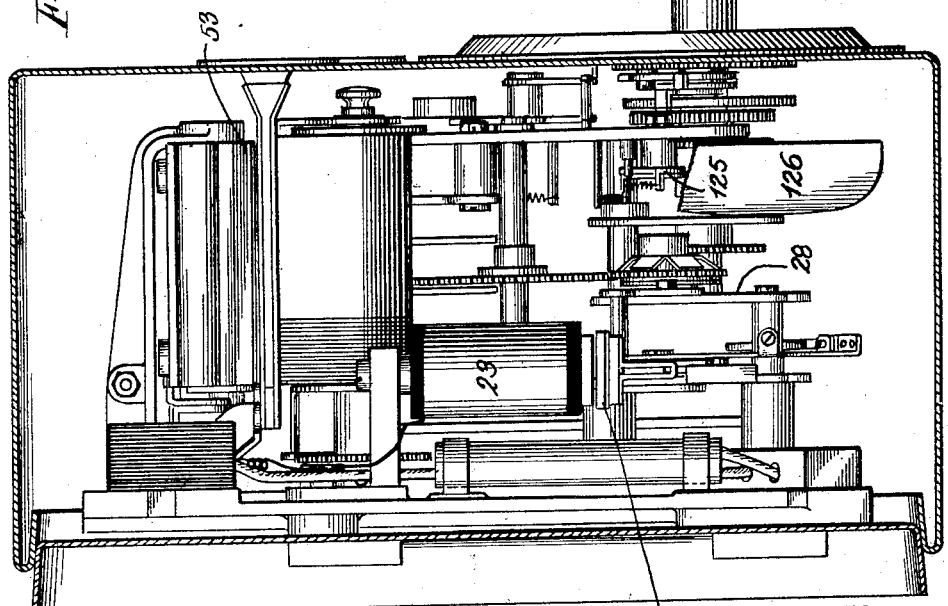
INVENTOR
C. E. Larrabee
BY
Kerr, Page, Cooper & Hayward
ATTORNEY C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 7.

INVENTOR
C. E. Larrabee
BY
Ken. Page-Cooper & Hayward
ATTORNEY

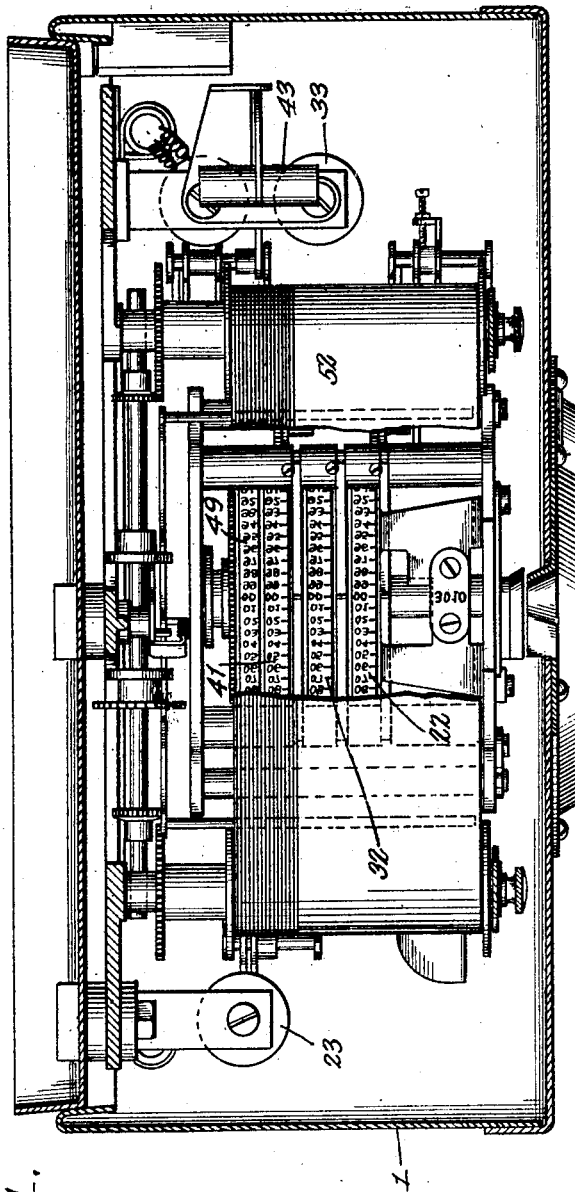

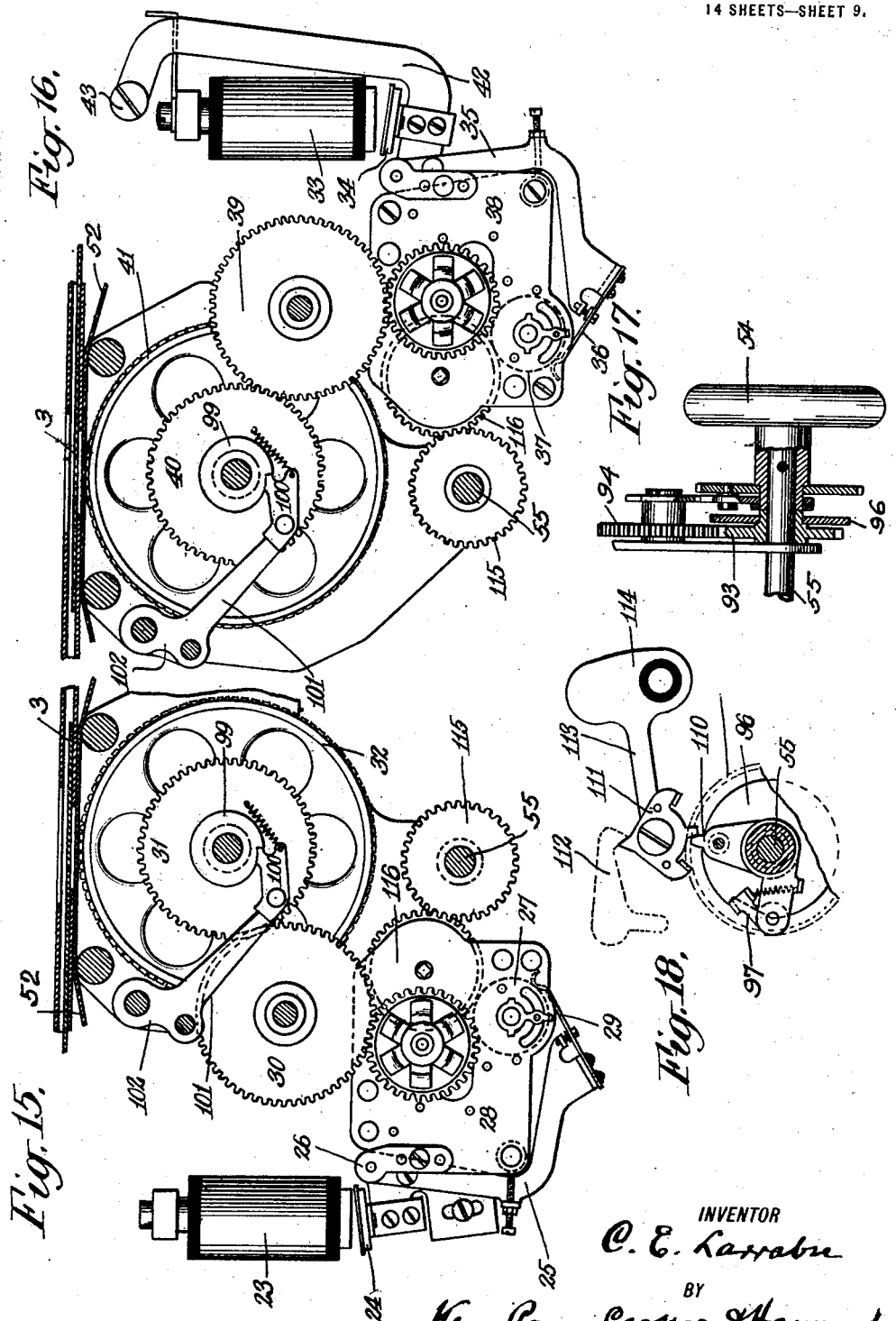

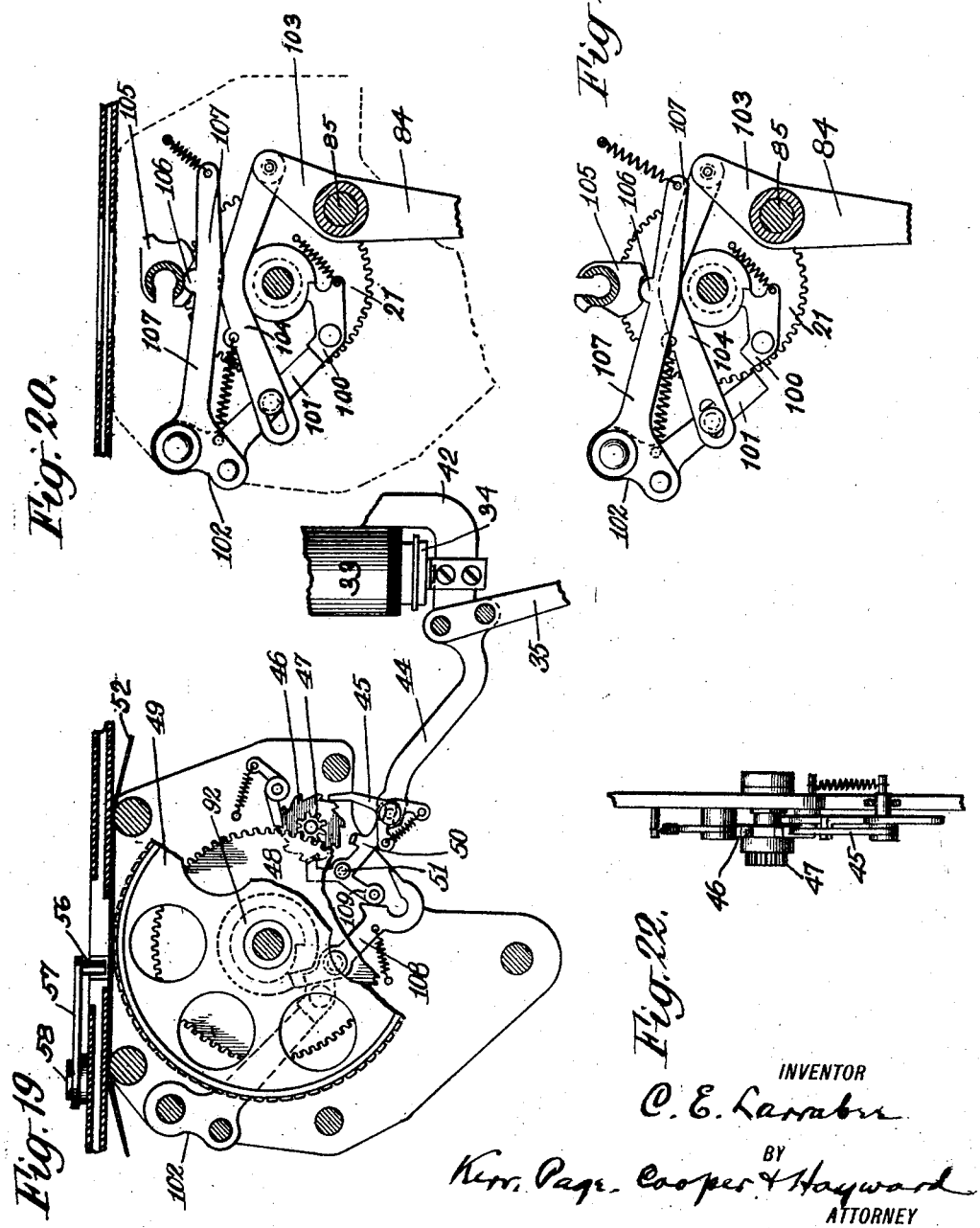

C. E. LARRABEE.
COASTER RECORDER.
APPLICATION FILED MAR. 27, 1919. RENEWED FEB. 9, 1920.
1,334,956.
Patented Mar. 30, 1920.
14 SHEETS—SHEET 11.
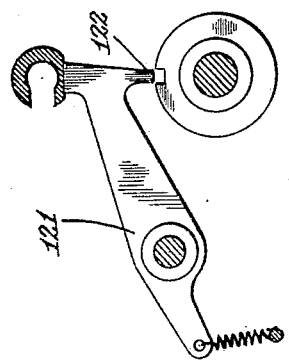
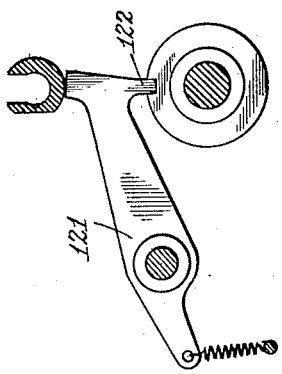
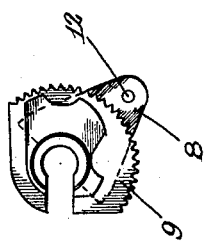
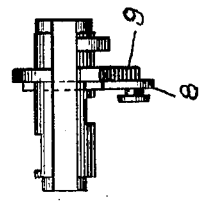
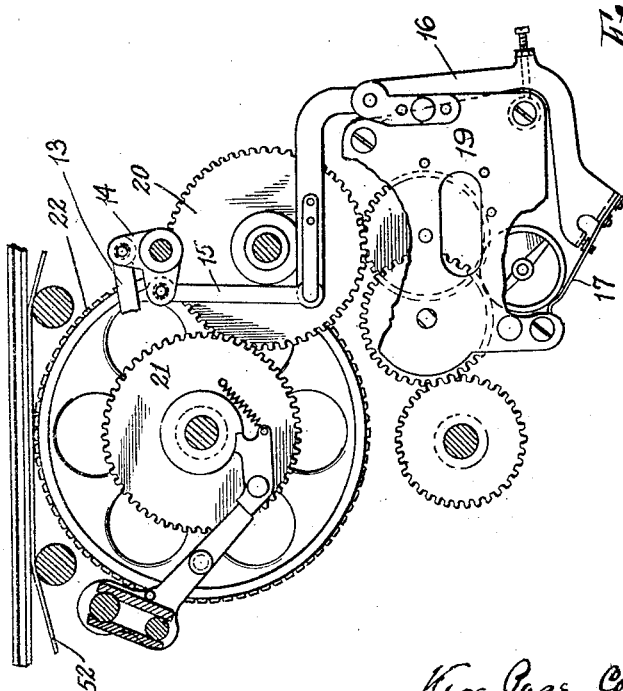
INVENTOR
C. E. Larrabee
BY
Kerr, Page, Cooper & Hayward
ATTORNEY C. E. LARRABEE.
COASTER RECORDER.
APPLICATION FILED MAR. 27, 1919. RENEWED FEB. 9, 1920.
1,334,956.
Patented Mar. 30, 1920.
14 SHEETS—SHEET 12.
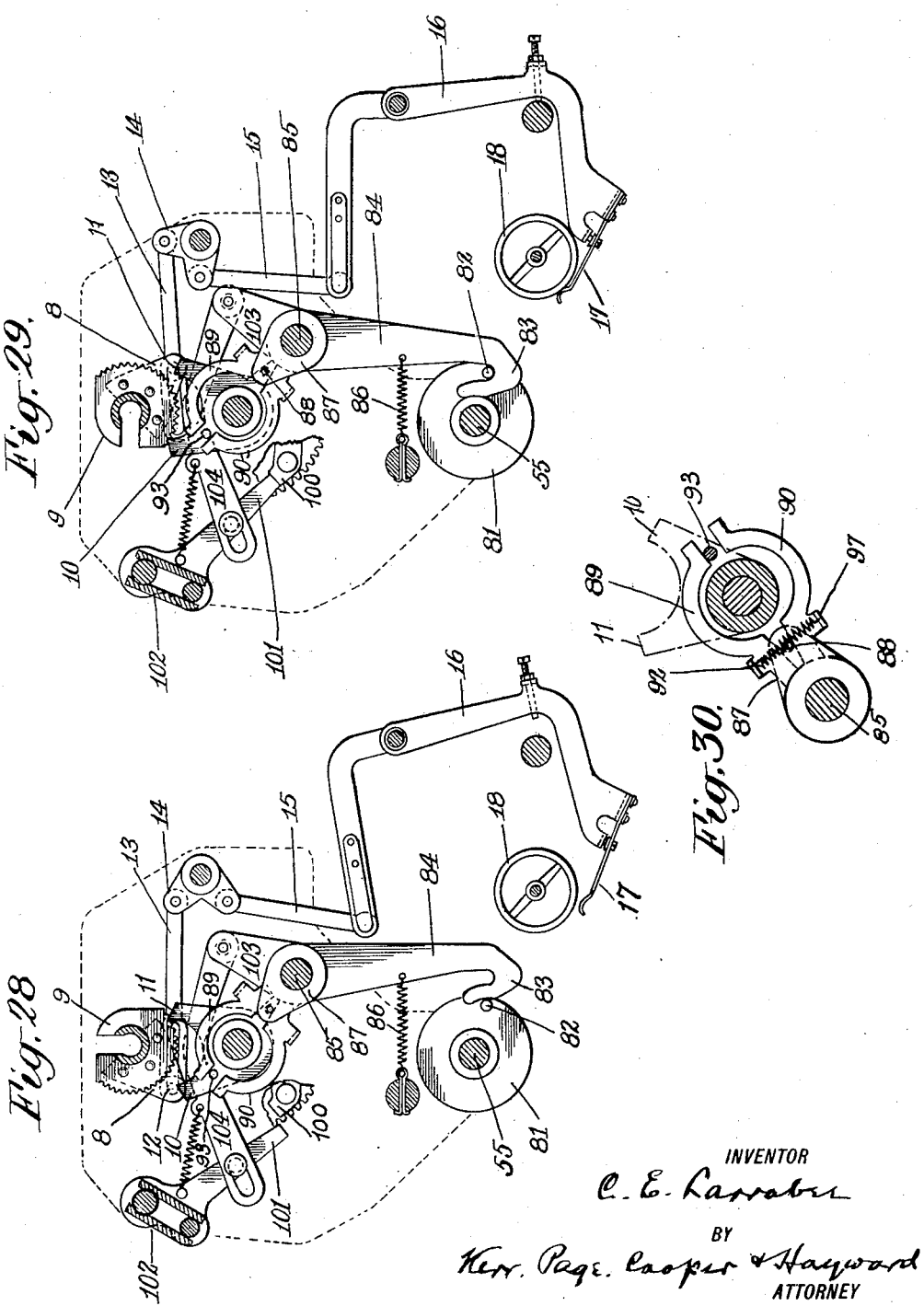

C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 13.

INVENTOR
C. E. Larrabee
BY
Kerr, Page, Cooper & Hayward
ATTORNEY

C. E. LARRABEE.
COASTER RECORDER.
APPLICATION FILED MAR. 27, 1919. RENEWED FEB. 9, 1920.

1,334,956.

Patented Mar. 30, 1920.
14 SHEETS—SHEET 14.

Fig. 38.

| TRIP NO | 1 | 2 | 3 | 4 | 5 | 6 | 7 | 8 | 9 | 10 | 11 | 12 | 13 | 14 | 15 | 16 | 17 | 18 | 19 | 20 | TOTALS | SHIFT | TOTAL |
|---|---|---|---|---|---|---|---|---|---|---|---|---|---|---|---|---|---|---|---|---|---|---|---|
| ECONOMIC & EFFICIENT RAILWAY CO. MOTORMAN'S TIME CARD ||||||||||||||||||||||||
| Run No 136  Route 22ⁿᵈ St  Date Nov. 25, 1915 ||||||||||||||||||||||||
| Name John E. Mahoney  Conductor's No. ||||||||||||||||||||||||
| CAR NO | 636 | 636 | 636 | 1274 | 1274 | 1274 | 1274 | 1274 | 543 | 543 | 543 | 543 | | | | | | | | | | | |
| BADGE NO | 450 | 450 | 450 | 450 | 450 | 450 | 450 | 450 | 450 | 450 | 450 | 450 | | | | | | | | | | | |
| R.T. | 45 | 49 | 47 | 44 | 46 | 46 | 43 | 45 | 48 | 47 | 45 | 45 | | | | | | | | | | | |
| C.T. | 19 | 15 | 15/16 | 15/16 | 15/16 | 16 | 13/14 | 16 | 13/14 | 15 | 16 | 18 | | | | | | | | | 188²| 550 | |
| S.T. | 02/03 | 06/07 | 05/06 | 05/06 | 02/03 | 06 | 06 | 02 | 05/06 | 08 | 07/08 | 06 | 03 | | | | | | | | | | |
| S. | 33 | 60 | 55 | 31 | 45 | 42 | 29 | 41 | 59 | 57 | 48 | 39 | | | | | | | | | 539 | 60 | |

J.S.K.  TIME CLERK

MOTORMAN'S PAY TIME
FIRST  SECOND  THIRD
ON  OFF  ON  OFF  ON  OFF
6:10 2:28 37 11:02 3:05 4:55 8:05  580

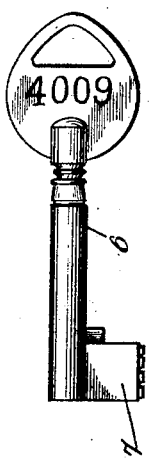
Fig. 35.

Fig. 36.

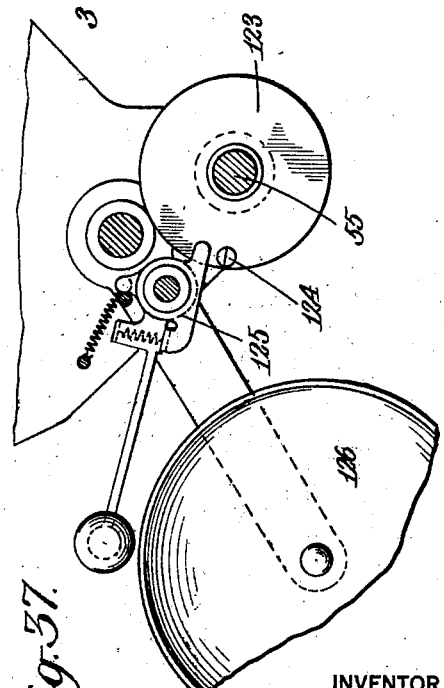
Fig. 37.

INVENTOR
C. E. Larrabee
BY
Kerr, Page, Cooper & Hayward
ATTORNEY

UNITED STATES PATENT OFFICE.

CLINTON E. LARRABEE, OF BINGHAMTON, NEW YORK, ASSIGNOR TO INTERNATIONAL TIME RECORDING COMPANY OF NEW YORK, A CORPORATION OF NEW YORK.

COASTER-RECORDER.

1,334,956.  Specification of Letters Patent.  Patented Mar. 30, 1920.

Application filed March 27, 1919, Serial No. 285,548. Renewed February 9, 1920. Serial No. 357,313.

*To all whom it may concern:*

Be it known that I, CLINTON E. LARRABEE, a citizen of the United States, residing at Binghamton, in the county of Broome and State of New York, have invented certain new and useful Improvements in Coaster-Recorders, of which the following is a full, clear, and exact description.

The invention which will be described in this specification forming part of my present application for Letters Patent is an improvement in what are known in railroading as coaster recorders, or in other words, devices which show the extent to which a trolley or other electrically propelled car has been run without the expenditure of power. This recorder is a development of the principle upon which such devices have heretofore been constructed and contains numerous features of novelty which contribute to its capabilities, its usefulness and practical value.

The coaster recorders heretofore in practical use comprise, as a rule, little or nothing more than recording mechanism which indicates on a paper strip by appropriate means the proportional time during a given run that the car has been in motion while the circuit controlling and brake controlling levers have been thrown to inoperative positions. In my improved recorder I have provided means for indicating not only this fact, but the number of stops, and the time occupied by the stops as well. I have also devised certain new accessories by means of which the operations and indication of the recorder are greatly modified and increased.

As the improvements reside mainly in the nature of the mechanism employed, they may best be comprehended from a detailed description of the recorder which will be given by the use of and reference to the accompanying drawings.

Fig. 7 is a side elevation of the same looking from the left.

Fig. 8 is an enlarged detail in elevation of a device used for stopping one of the clock mechanisms employed in the device.

Fig. 9 is a top plan view of the parts shown in Fig. 8.

Fig. 11 is a similar view taken on the line 11—11 of Fig. 2.

Fig. 14 is an enlarged detail of a key hole used in the device.

Figs. 15 and 16 are enlarged views in elevation of two of the clock mechanisms used in the recorder.

Fig. 17 is a detail on an enlarged scale of a hand knob and its immediately connected parts.

Fig. 18 is a detail of a device for indicating when the recording wheels have been turned back or reset to zero position.

Fig. 19 is a view partly in section of the means for recording the number of stops made by a car carrying the recorder.

Fig. 20 is a detail of certain mechanism actuated by turning a key in the key hole.

Fig. 21 is another view of the same parts in another position.

Fig. 22 is a side view of Fig. 21.

Fig. 23 is a view partly in elevation and partly in section of one of the clock mechanisms and means for arresting its movement.

Figs. 24 and 25 are details of a device intended to be operated by the turning of the inserted key.

Figs. 26 and 27 are details of the key hole and associated parts.

Figs. 28 and 29 are enlarged details of a clock mechanism showing means for stopping and starting the same.

Fig. 30 is an enlarged detail of a portion of the mechanism shown in the two preceding figures.

Figs. 35 and 36 are views of a key used for controlling the operation of the device.

Fig. 37 is a detail of a bell sounding mechanism operated when the record is printed, and Fig. 38 is a view of a record card as printed by the machine.

All corresponding parts throughout this drawing are indicated by the same numerals so that detailed descriptions of certain figures are rendered unnecessary.

Figure 1:
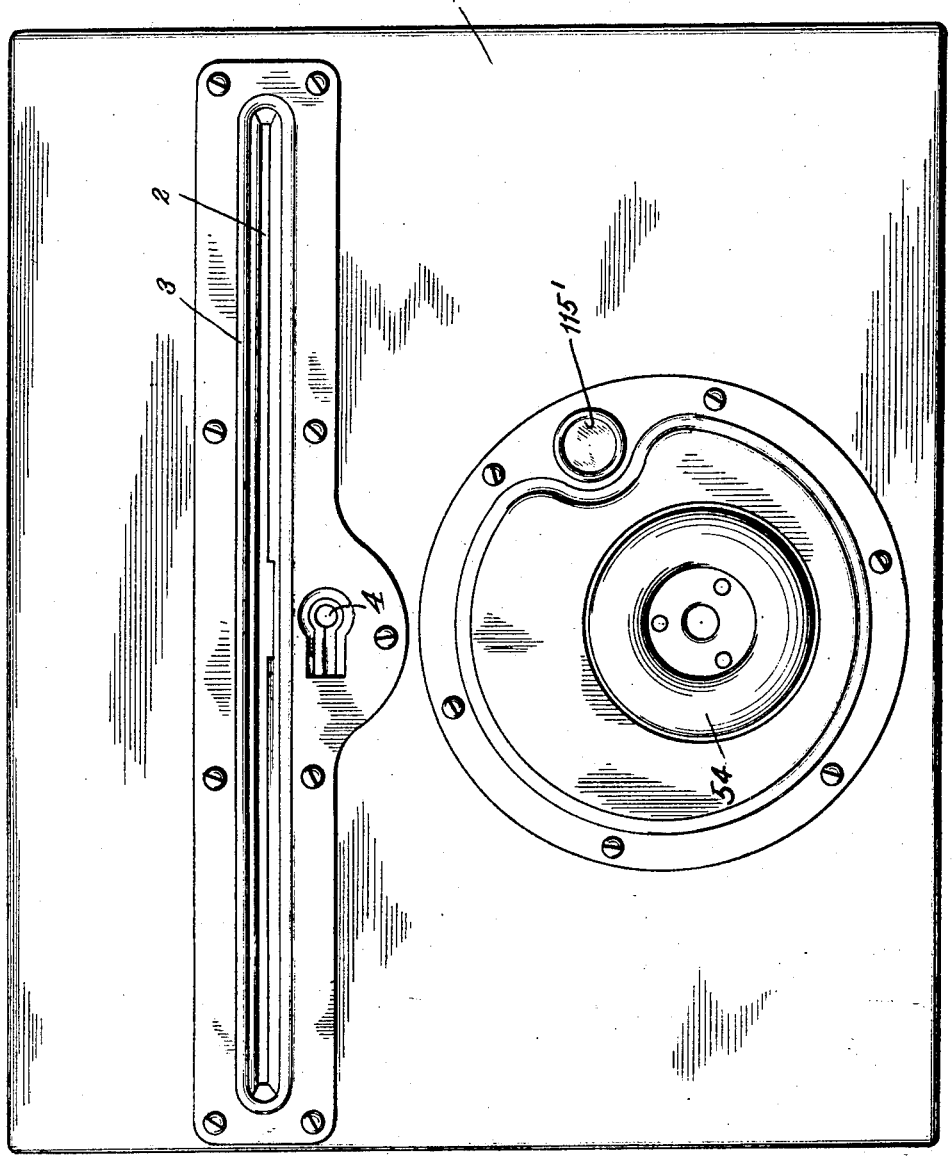
Figure 1 is a front view in elevation of the recorder box or casing.

The machine is inclosed in a suitable case 1, which is adapted to be secured at any convenient point in a car whose operations it is desired to record. In the front of this case is a card slot 2 into which a record card 3 such as shown in Fig. 38, is intended to be passed when the record made by the device is to be printed thereon. The case has also a key hole 4 shown in detail in Fig. 14, as having two hinged spring actuated plates 5 which normally cover and substantially close the opening, but which are forced aside by the key when the latter is inserted.

As the mechanical elements used are not complicated nor difficult to understand, they will be described, as far as practicable, by a statement of the operation or manner of using the mechanism as a whole. For this purpose let it be assumed that the motorman of a car who is to be credited with the amount of coasting which he accomplishes, is furnished with a key 6, Figs. 35 and 36, which is identified by a certain number and has this number in raised type on the front edge of the bit 7. When he is ready to start on a trip he inserts this key in the key hole 4 with the bit in a flat or horizontal position. The key operates when turned to impart rotary movement to a plate 8, having secured thereto a segmental ratchet plate 9, and when the key is first inserted this ratchet 9 is engaged by the left hand member of a double pawl 10 which prevents the key being turned anti-clockwise but permits it to be turned clockwise to a vertical position, or in other words, from the position indicated in Fig. 29, to the position shown in Fig. 28, and after its insertion it is so turned. One result of this is to bring the type thereon into the printing position.

Figure 2:
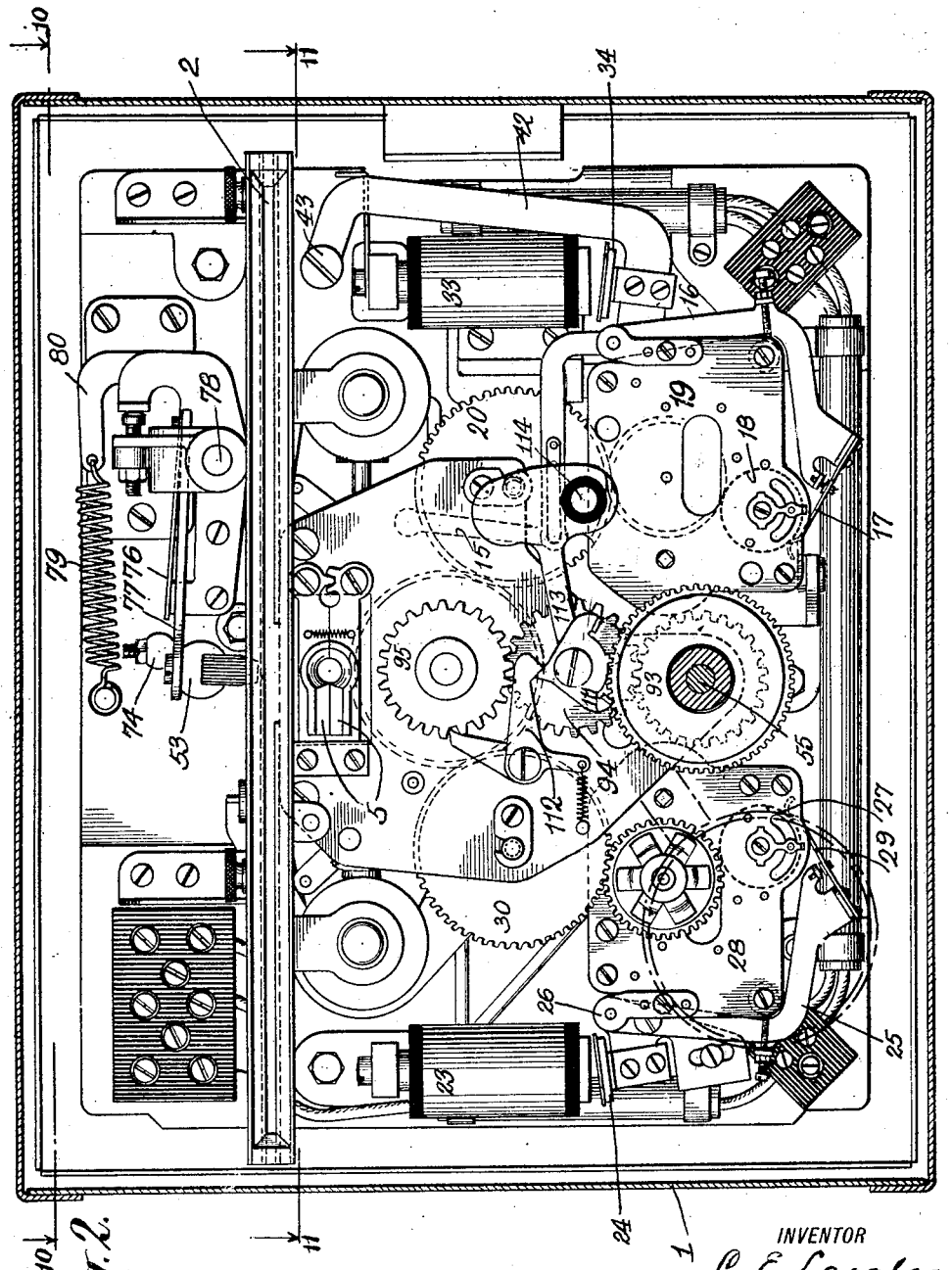
Fig. 2 is a front view in elevation of the working mechanism as displayed by removal of the front of the case, this view being taken on the line 2—2 of Fig. 6.
Figure 5:
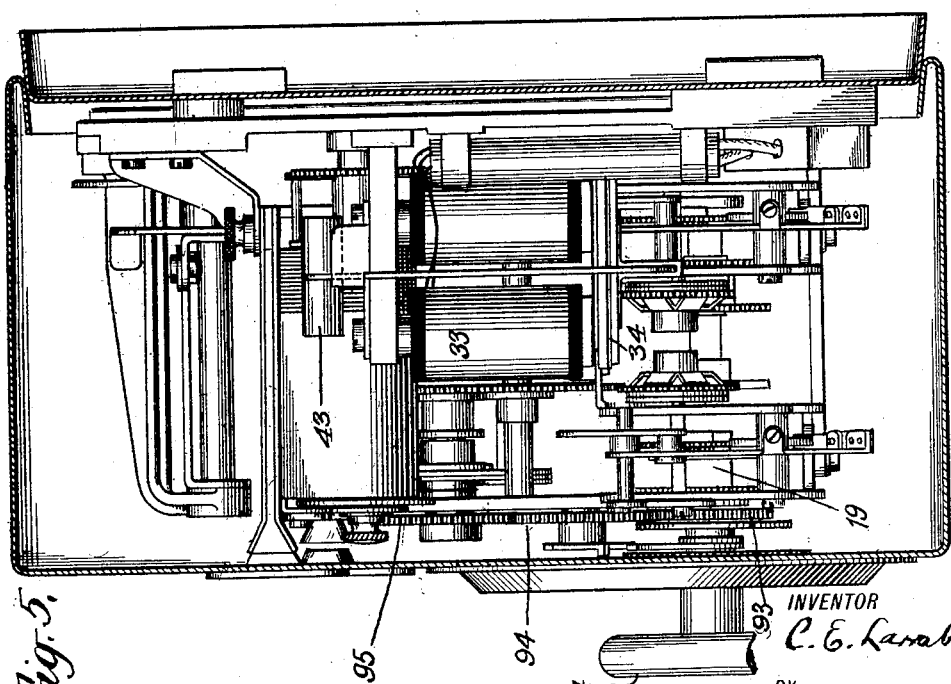
Fig. 5 is a side elevation of the interior operating mechanism as viewed from the right.
Figure 13:
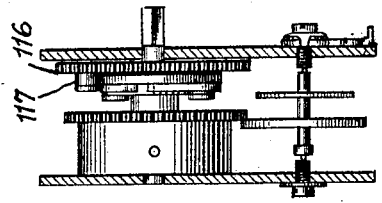
Fig. 13 is a side view in elevation of a clock mechanism.

The plate 8 has an eccentric pin 12 that engages with a slot in a link 13 connected to a bell crank lever 14, which latter by a link 15 connects with a bent lever 16, pivoted to the frame that carries a brake 17 at its end which is normally in contact with the balance wheel 18 of a running time clock mechanism, in the forward right hand corner of the case and marked 19 in Figs. 2 and 5. By the turning of the key therefore through a forty-five degree arc, the pin 12 forces down the lever 13 and this operates, by the means described, to start the running time clock in operation. This clock train is in gear through spur wheel 20, Fig. 23, with the wheel 21, properly connected and driving in the usual manner the disk or disks 22, which have raised time type on the periphery and which bring to the printing position those type which at any given moment indicate elapsed time.

Assuming that the car is started on the run immediately after setting the running time clock in movement, it may now be assumed that nothing happens to interrupt its free movement under power until a station is reached. The motorman should then calculate how far the headway of the car will carry it after power is shut off and throw off the current controlling and brake controlling handles which, as always in such cases, operate conjointly to close the circuit of a coaster magnet 23, Figs. 2, 3 and 15, which being energized, attracts its armature 24, and thereby raises a bell crank lever 25 pivoted to a stationary arm 26, and by this action withdraws from a balance wheel 27 of the coaster time clock movement 28, a brake 29 which it carries. This clock movement imparts through gear wheels 30 and 31, movement of rotation to a disk or disks 32 which have time type on the periphery and bring that type to the printing position in the usual manner.

Figure 3:
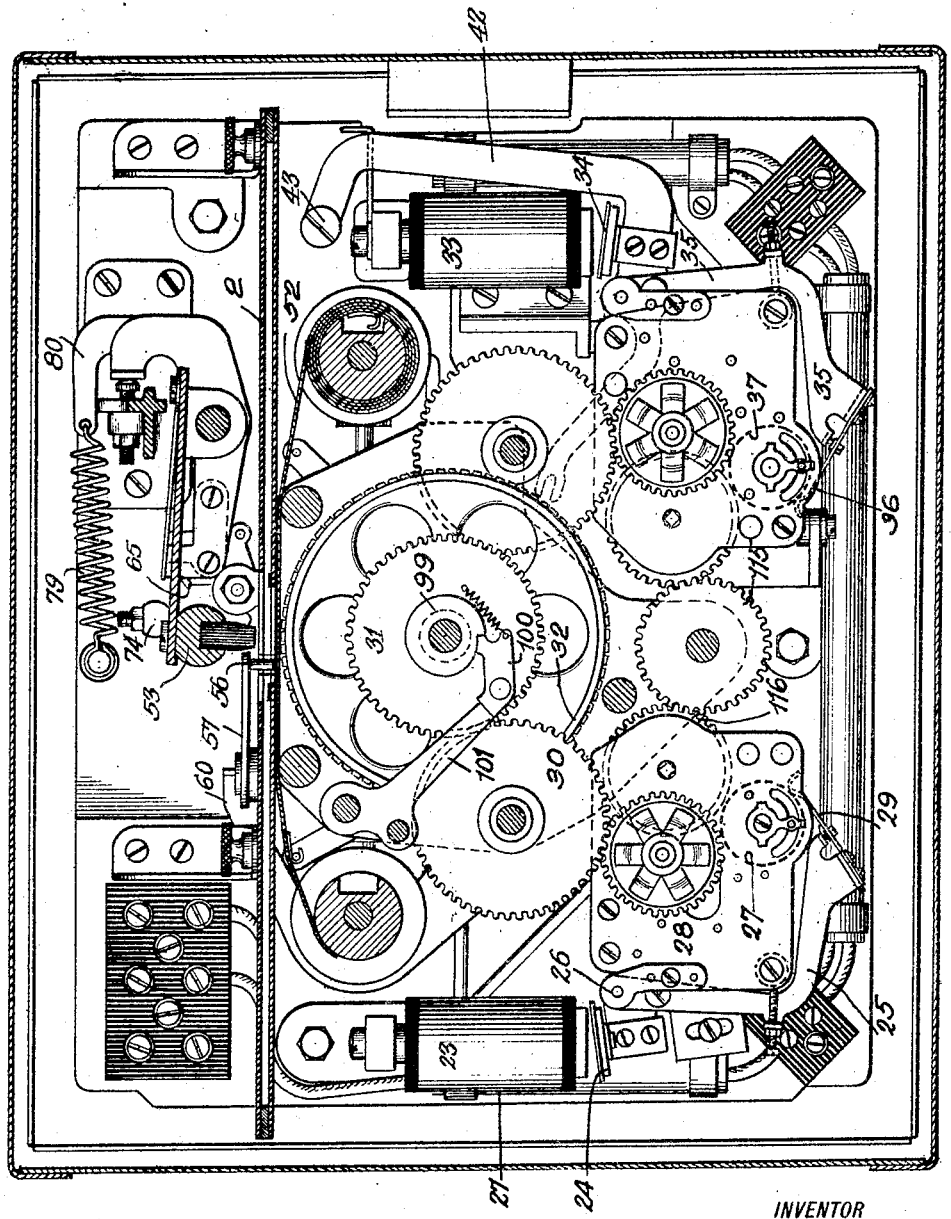
Fig. 3 is a sectional view of the mechanism taken on the line 3—3 of Fig. 6.

The car after thus running free for the proper distance is checked by the application of the brake lever or accelerated by the current lever, by the operation of either of which the coaster magnet is deënergized, and when the car comes to a standstill the time stop magnet 33, Figs. 2, 3 and 16, is energized. The special means for doing this are not illustrated as they are well within the knowledge of those skilled in this art. The energization however, of magnet 33 raises its armature 34, lifts the pivoted bell crank lever 35 and withdraws the brake 36 from the balance wheel 37 of the stopping time clock movement 38, which by gears 39, 40 imparts movement to the time type disk or disks 41, as will be understood from the foregoing.

The application of the current or brake handles, as stated above, interrupts the current through the coaster magnet 23, and the coaster time clock immediately stops. It will be observed that the coaster clock only runs while the conditions are right for the coasting or free running of the car, and in the same way the stop time clock runs only during such periods as the car may be at rest, for the moment that the car starts in motion after a stop the magnet 33 is deënergized and the clock movement 38 is stopped.

The armature 34, of the stop time magnet 33, see Figs. 3 and 16, has an upwardly extending arm 42 carrying a counterbalancing magnet 43 to render the parts more sensitive to the action of the magnet and which is not required for the magnet 23. Extending also to the left from the armature or any part moved thereby is an arm 44, Fig. 19, which carries a pivoted pawl 45 and adapted on the movement of armature 34, to operate through the instrumentality of said pawl a ratchet wheel 46, which through a pinion 47, turns a gear wheel 48, that imparts rotary movement to a type disk 49. The arm 44 is pivotally connected to a stop pawl 50 pivoted at 51, which has other functions presently to be described. From the above it will be seen that whenever the magnet 33 is operated to start the stopping time clock mechanism, the stop is recorded through the instrumentality of the means just described to the type disk which indicates at any time the number of stops made after the original start.

It will now be understood that at the end of any given trip or run the several type disks will have been set by the means described to indicate the total running time, the total stopping time, the total coasting time, and the number of stops. An inking ribbon 52, Fig. 11, is carried over the type disks and a printing platen 53, Figs. 2, 4, 6 and 7 is provided for printing upon an inserted card the type thus brought to the printing position.

Passing now to the operation of the instrument and the manner of using it for its intended purpose,—the motorman's key can only be withdrawn or can only be inserted when the key hole and its associated parts are in the position indicated in Fig. 29. The mere insertion of the key effects no result and does not put the instrument into operative condition, but the key must first be turned to a vertical position as it can be only when the parts are in the position shown in Fig. 29, and as has been explained above this starts the running time clock and locks the key in. At this time also all the type disks have been set to zero position and whether they be moved or not from such position a printed record may thereafter be taken at any time, and the means employed for this purpose will now be described.

Fig. 29 illustrates the machine ready for use but not started in use. A key being first inserted is then turned to the vertical position where it is locked by the pawl arm 10 and the runing time clock started.

Figure 4:
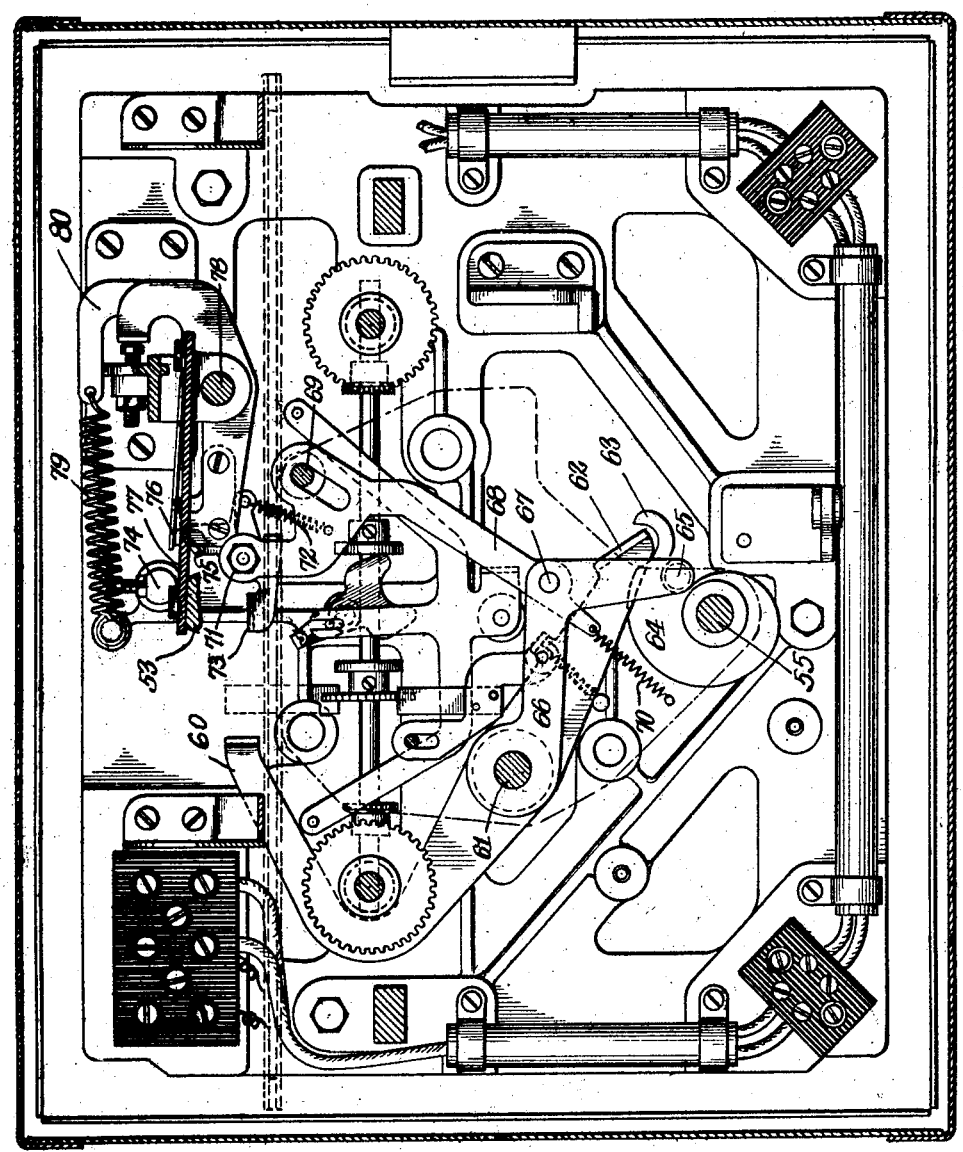
Fig. 4 is a sectional view of the same mechanism taken on the line 4—4 of Fig. 6.
Figure 6:
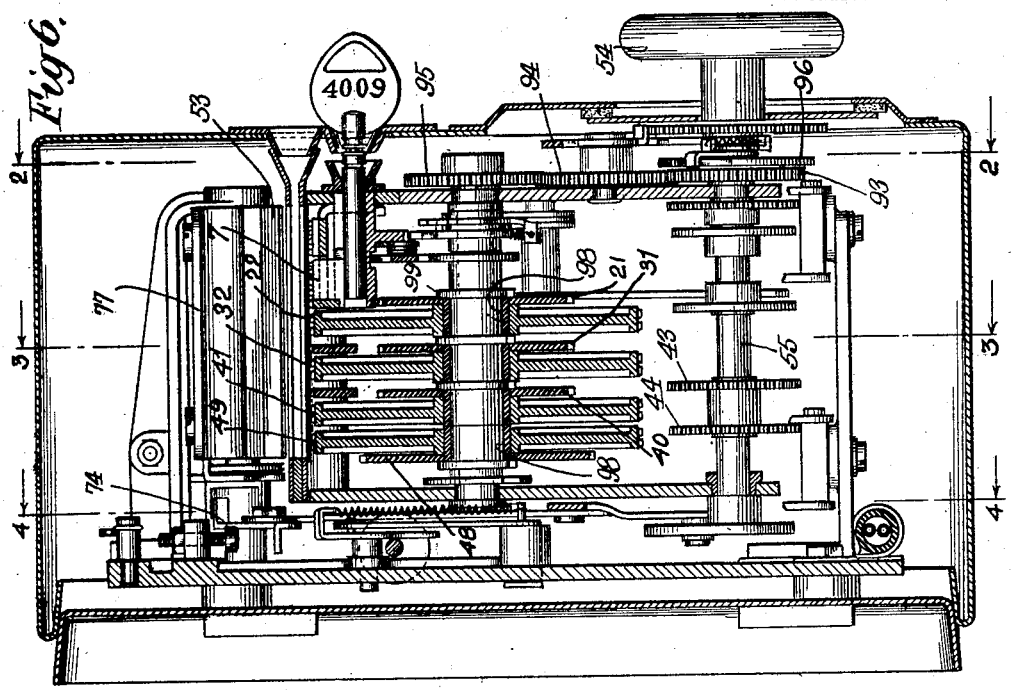
Fig. 6 is a central vertical section of the same looking from the left.

Extending through the front of the case 1 is a shaft 55, carrying a handle or knob 54 by the partial rotation of which the printing and other operations are performed. This knob however may not be turned in either direction from its position as shown in Fig. 29, until a card to receive an imprint has been inserted to its full extent in the chute. When this is done the lower edge of the card encounters a pin 56, Figs. 3 and 10, which is carried by a right angled lever 57 pivoted at 58, and having a bifurcated end which embraces the bent-over end of a lever 60 pivoted, as shown in Fig. 4, at the point 61, and provided with an end 62 formed as a catch to engage with a hook 63, extending from a cam plate 64 on the knob shaft 55. By such engagement the knob shaft is normally locked against movement in one direction, but when a card is inserted it is unlocked and free to be turned anticlockwise.

By this movement of the knob shaft the cam plate 64 by engagement with a stop 65, at the end a right angled lever 66, pivoted at 61, raises this lever. Pivoted at 67 to said lever 66 is a plate 68 which is guided by a fixed pin 69 working in a slot therein and retracted by a spring 70. To the plate 68 at 71 is pivoted a three-armed lever retracted by a spring 72 and as the plate 68 is raised one arm 73 of said lever encounters a fixed stop 74 and the lever is turned about its pivotal point. In rising a second arm 75 of this lever which has an inclined end, engages a stop 76 on a printing lever 77, pivoted at 78, and raises this lever against the force of a spring 79, connected to its shaft by an arm 80, but when the three-armed lever has been sufficiently turned by engagement with the stop 74, its inclined end 75 slips off the stop 76, and the printing lever which carries the platen 53 is thrown downward by the spring 79 and effects the printing. The printing is not effected until the cam plate 64 has been turned through a full revolution and the hook 63 has engaged the pin 65 and locked the knob shaft against further anti-clockwise rotation.

The card is then removed but the knob shaft which in the movement which has effected this operation, has been turned from a position which finds the parts as shown in Fig. 29, to that in which these parts are shown in Fig. 28. In other words, on the knob shaft is a disk 81 carrying a pin 82, and before the above described movement this pin rested in a hook 83 on the end of a lever 84, pivoted at 85, and retracted by a spring 86. A short arm 87, which partakes of the movement of lever 84, carries a pin 88, which lies between two movable jaws 89—90 pivoted at 85, and operating like the blades of a pair of scissors except that the points 91 are connected by a spring 92 shown in dotted lines in Fig. 30. When therefore the parts are in the positions shown in Fig. 29, the arm 87 is moved to its limiting clockwise position and the pin 88 has engaged the jaw 89, Fig. 29, and raised that jaw off from a pin 93, on the pivoted plate whose two pawl arms are marked 10 and 12, which permits the other arm 90 under the action of spring 92, to shift this plate and throw the arm 10 into engagement with the ratchet teeth on plate 9.

By the anti-clockwise movement of the knob shaft, the pin 82 on disk 81 strikes the side of the catch end of lever 84, and throws that lever to the right, as shown in Fig. 28. This depresses the arm 87, and with it the jaw 90, which permits the jaw 89 to throw the pawl 10 out of another pawl 12 into engagement with the ratchet plate 9, under which conditions the key may be turned back to the horizontal and withdrawn.

After the movement of the knob shaft which effects the printing has been completed and the hook 63 has engaged the pin 65 and stopped it, the machine is brought into inoperative condition by the withdrawal of the card and key, and cannot be restored to operative condition again until the type wheels have all been reset to zero position. To accomplish this the knob shaft must be turned back to the position indicated in Figs. 4 and 29, which movement is the only one it is then capable of making. In Fig. 2, three gear wheels 93, 94 and 95 are shown and these are in mesh with the shaft carrying the type disks or wheels and operate to turn the latter back to zero when rotated by a clockwise movement of the knob shaft.

By reference to Fig. 18, the means for effecting this operation will be understood. On the knob shaft 55 is a disk 96 turning freely thereon. On the said shaft and rigidly fixed thereto is an arm carrying a spring actuated pawl 97 that engages with a notch in disk 96 and turns said disk when the knob shaft is rotated clockwise. The disk 96 is fixed to the gear wheel 93 and this motion of the shaft 55 transmits rotation to the type wheels and sets them all to zero. This is rendered possible by the fact that there is, as usual, a frictional drive connection between the said wheels and the driving clock mechanism, and by the fact that the said wheels are not fixed to their shaft, but turn with bushings 98 thereon, see Figs. 6, which are fast to the gears 21, 31, 40 and 48 and are rotated clockwise by cams 99 on the type wheel shaft engaging with pawls 100, pivoted to the said gear wheels.

Figure 10:
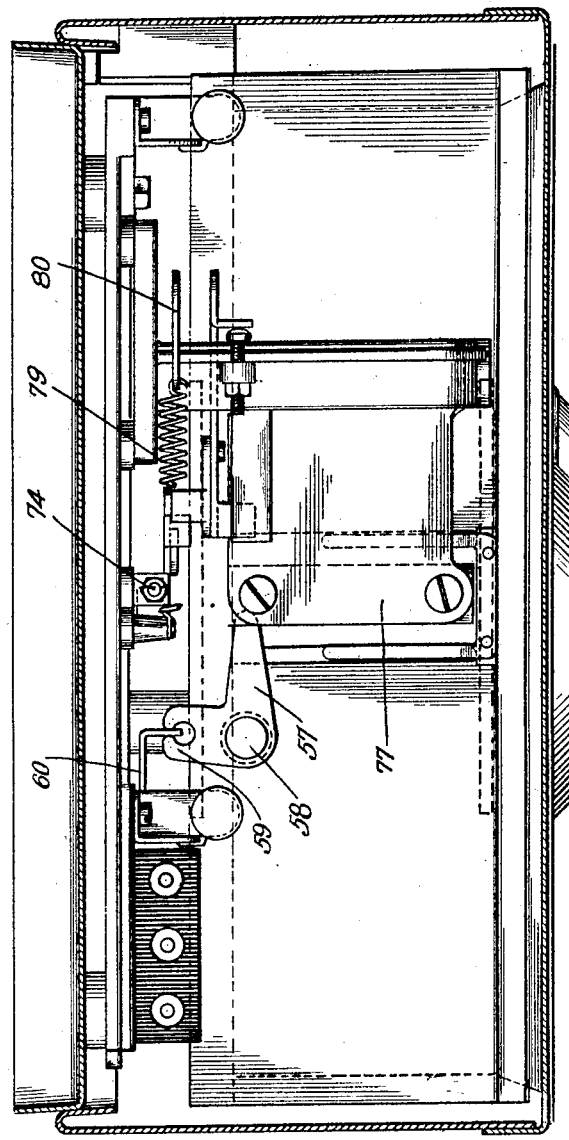
Fig. 10 is a sectional plan taken on the line 10—10 of Fig. 2.

The clocks, it will be observed, drive the type wheels through such gears as 30, 39, Figs. 10 and 16, in a clockwise direction, but normally stop levers 101 carried by a swinging frame 102, stand in the path of the pawls 110 and in the zero position of the type wheels, in contact therewith, and this engagement has been brought about by setting the wheels to zero as will be well seen by reference to Fig. 29. In this figure the lever 84 is shown to have a short arm 103, which connects by a bent link 104 having a slot therein, with a pin on one of the stop levers 101. When, therefore, the lever 84 is pulled by the pin 82 on disk 81 to the left the arm 103 pulls the stop levers to the right or into the path of the pawls 100, and these levers therefore constitute the zero stops for the type wheels. They not only prevent further clockwise movement of the knob shaft, but lock the type wheels against any movement in the same direction which the clock might tend to impart to them.

When a key, however, is inserted in the key hole, see Fig. 20, and turned to the vertical position to start the running time clock, a cam plate 105 turned by such movement of the key engages a projection 106 on an arm 107, rigid with frame 102 and thus operates to depress the stop levers to the position shown in Fig. 21, to free the type wheel gear and permit the said wheels to move under the driving influence of their respective clocks.

All of the type wheels are thus capable of being rotated clockwise by their respective motors, and of being reset to zero by means of the knob shaft after each printing operation. The disk, however, which indicates the number of stops, see Fig. 19, not being set by a clock, but by the arm 44, which carries a stop pawl 45, could not be turned to the zero position were this pawl always in engagement with the ratchet wheel 46. To release this type wheel, therefore, a lever 108 pivoted to a stationary support, has a short arm traveling on the periphery of a cam on the type-wheel shaft, and a bifurcated long end, between the jaws of which extends an arm 109 from the pawl 50, having a pin that is engaged by said jaws. On the movement of the type-wheel shaft for resetting, the cam thereon shifts the lever 108 and throws the arm 109 and pawl 50 into a neutral position where both its ends are out of engagement with the ratchet wheel 46, which allows the stop number type wheel to be reset to zero.

When the knob shaft is turned to the position indicated in Fig. 29, to reset the type-wheels, a stop 110 on the disk 96, Fig. 18, engages a projection on a plate 111 pivoted to a stationary support, and turns the same through a short arc. A central point on plate 111 normally engages a stop pawl 112 for the resetting gear member 95 and an arm 113 extending from the plate carries a target 114. When therefore by the full movement of the knob shaft required to reset the type wheels the plate 111 is moved, it disengages the pawl 112, and raises the target so that the latter becomes visible through a window 115, in the front of the case. In this way the resetting gears are locked against backward motion until the knob shaft is turned to print and the target shows that the apparatus has been reset to zero.

Figure 12:
Fig. 12 is a detail of a winding ratchet.
Figure 32:
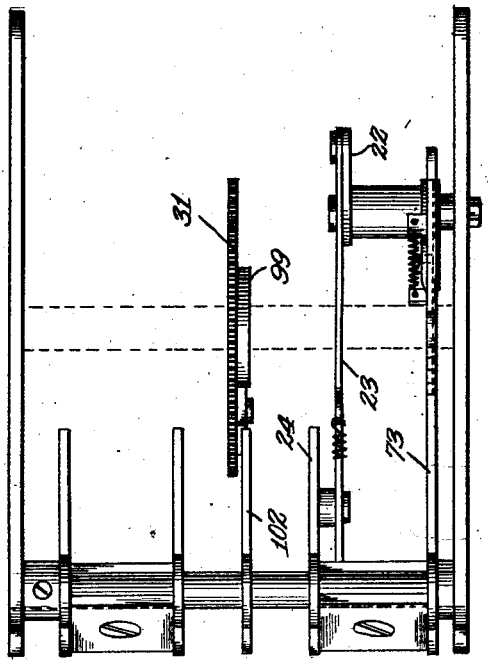
Figs. 31 and 32 are details of the frame and some of the gears.
Figure 34:
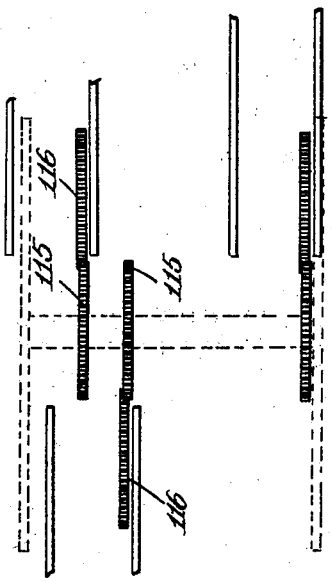
Figs. 33 and 34 are diagrammatic views of certain gears used in the device.
Figure 31:
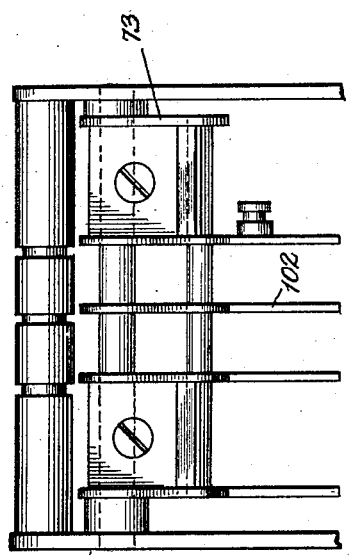
Figure 33:
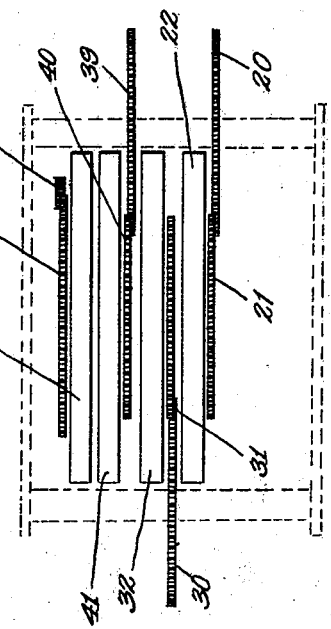

It is desirable that the clocks be kept wound and that as they run down they should only be wound up to a corresponding extent, and for this purpose I supply means brought into operation by the movement of the knob shaft which resets the type wheels to perform the necessary rewinding. It will be observed from Figs. 3, 15 and 16, for example, that there are gear wheels 115 on the knob shaft engaging through gears 116 with the winding arbor of the clocks, and for purposes of illustration, the means for winding up the running time clock on the right hand side of the knob shaft is shown in Fig. 12. The other devices are of a similar kind and are not illustrated in detail.

In this figure 116 is the gear wheel turning about the winding arbor freely which, when the type wheels are reset by turning the knob shaft in a clockwise direction is rotated, according to the position of the parts in the figure under consideration, counterclockwise by the gear wheel 115, and when the knob shaft is turned back to operate the printing mechanism is turned clockwise. Let it be assumed that the knob be turned to print, then a pawl 117 carried by the gear 116 is carried over the periphery of a disk 118 rotated on the clock around to a point which leaves it almost one-sixteenth of an inch short of a notch in said disk. This is its normal position after each operation of the printing mechanism.

As the clock runs down the disk 118 turns clockwise and the notch therefore leaves the pawl behind as the gear wheel 115 is stationary. Hence when the type wheels are reset the pawl is advanced over the periphery of disk 118 until it meets the notch with which it then engages and forces it back through the same arc by which it left the pawl behind. As the disk moves clockwise the pawls 119 which it carries ride over the teeth of a ratchet 120, but when moved anti-clockwise these pawls engage the ratchet and thus impart a winding movement to the inner end of the clock spring.

Thus by one printing movement of the knob shaft the pawl 117 is just short of the notch in disk 118, and by one resetting movement of said knob shaft the clocks are moved up to the exact extent that they may have run down.

I have now described in sufficient detail the nature and purpose of all of the essential parts of the improved recorder. There are certain accessories which are shown but which call for but little explanation. For example, in Figs. 24 and 25, a device for locking and unlocking any part of the mechanism, dependent upon the position of the key, is shown, although this is not necessarily used. This consists of a spring actuated lever 121 having a stop 122 which may be caused by the movement of the key to engage with or be permitted to disengage from a rotary member of the mechanism.

Another accessory is shown in Fig. 37, in which 123 is a disk on the knob shaft carrying a pin 124. When the shaft is turned to print to its fullest extent, this pin trips a spring actuated lever 125, carrying a bell hammer that strikes a bell 126, and thus gives an audible signal each time that the printing is effected.

In Fig. 38 a card adapted for use in the machine is shown. The car number is printed in its appropriate column on this card by a permanently set type. The motorman's number is printed from the key when turned to a vertical position, and from the type wheels when set are printed the running time, the coasting time, the stopping time and the number of stops. From a number of records thus made on a card the motorman's record may be made up and credits to or charges against him are readily computed.

The invention does not, it will be seen, depend solely upon the specific construction of the elements set forth herein, but rather upon their functions or capabilities and with this understanding the claims should be read.

What I now claim is:

1. In a coasting recorder, the combination with a record printing mechanism, of a plurality of sets of type-wheels one set for indicating running time, another coasting time and another stopping time, independent motors for rotating and thereby setting up the several sets of wheels, and means for starting each of such motors at the beginning of the periods during which it is intended to make records and stopping the same at the ends of such periods.

2. In a coasting recorder, the combination with a hand-operated record printing mechanism, of a plurality of sets of wheels with type thereon each indicating data of different character, such as running time, coasting time, and stopping time, of three independent clock movements adapted when running to turn and set said sets of type wheels, means for starting each of said clock movements at the beginning of periods during which it is intended to set the said wheels, and for stopping it at the ends of such periods.

3. In a coasting recorder, the combination with sets of type wheels for indicating running time, coasting time and stopping time, of means for printing the records set up by such sets of wheels, means operating simultaneously with the operation of the printing mechanism for resetting to zero all of the wheels of the several sets, a manually-operated shaft for controlling the operation of the printing and resetting means by movements in opposite directions, and means for preventing the movement of said shaft in either direction through arcs greater than required for a single performance of the operation for which it may be turned.

4. In a coasting recorder, the combination with type wheels for setting up records of running time, coasting time and stopping time, of a manually-operated shaft, printing mechanism, means for resetting all the type-wheels to zero position operated by said shaft, a means for locking the entire mechanism against all operation operated by the resetting means, a rotary key receiver, and means operated by the movement thereof for unlocking the mechanism for operation when the said receiver is moved by the rotation of an inserted key.

5. In a coasting recorder, the combination with a printing mechanism and type wheels for setting up records of running time, coasting time, stopping time and the number of stops, of a magnet operative to start and stop the type wheels for indicating stopping time, an armature for said magnet, and a means operated by the movements of said armature for operating the type wheels which indicate the number of stops.

6. In a coasting recorder the combination with a printing mechanism, of type wheels for indicating coasting time, running time or other like data, a manually operated shaft for controlling the operation of the printing mechanism, gears from said shaft to the type wheels by means of which a movement in a given direction of said shaft operates to reset all the type wheels to zero position, and a stop for checking such movement when the zero point is reached operated by and at the completion of the operation of said resetting means.

7. In a coasting recorder the combination with a printing mechanism, of type wheels for indicating coasting time and other like data, of a manually operated shaft for controlling the operation of the printing mechanism, means for resetting all the type wheels to zero position operated by the manually operated shaft, clock motors for operating or moving the type wheels to set up their records, and means for rewinding to the extent to which they have run down such motors by the manually operated shaft when moved to reset the type wheels.

8. In a coasting recorder the combination with the recording disks or type wheels, of means for setting them to zero position and thereby locking the machine against operation, of a part adapted to receive a key and which when turned through a given arc unlocks the machine and puts it in condition for operation, means for locking the key in its turned position so that it may not be withdrawn, a printing mechanism, and means dependent for action upon the operation of the same for releasing the key member and permitting it to be turned to position in which the key may be withdrawn.

9. In a coasting recorder, the combination with a printing mechanism, of type wheels for indicating coasting time and other like data, means for resetting the type wheels to zero position after an impression has been taken, a manually operated shaft for controlling the operation of the printing and resetting mechanisms, means for locking said shaft against movement when the type wheels are set to zero position, and a means operated by the insertion into the machine of a card to be printed which releases the manually operated lever and permits it to be moved to operate the printing mechanism.

10. In a coasting recorder, the combination with a printing mechanism, recording type-wheels, and means for resetting the same to zero position after each impression, of a key holder adapted to be turned by an inserted key through a given arc, a manually operated shaft for operating the printing and the resetting mechanisms by movements in opposite directions, a locking means for the key holder operatively related to the manually operated shaft and adapted to be set to lock the key holder in its turned position by the movement of the shaft which resets the type wheels, and to be set to release the same so as to permit the withdrawal of the key by the movement of said shaft which effects the printing operation.

11. In a coasting recorder, the combination of a rotatable key receiving member, adapted when turned from its normal position to lock the key against withdrawal, of a manually operated shaft for controlling the operation of the recorder, a pivoted lever adapted to be shifted to one side or the other by the movements of the shaft which are required to operate the device, and means controlled by the said pivoted lever for locking the key receiving member against rotation in one or the other direction according to the position of the said lever.

12. In a coasting recorder, the combination with printing mechanism, of a plurality of clock movements for setting type disks to indicate coasting time, running time, and the like, of a manually operated shaft for controlling the operation of printing and resetting the type wheels, of gears between said shaft and the winding arbors of the clock movements whereby the said clock movements are wound by the movement imparted to the shaft for resetting the type wheels.

In testimony whereof I hereunto affix my signature.

CLINTON E. LARRABEE